US009947218B2

(12) United States Patent
Murai

(10) Patent No.: US 9,947,218 B2
(45) Date of Patent: Apr. 17, 2018

(54) TRAFFIC-LIGHT CYCLE LENGTH ESTIMATION DEVICE

(71) Applicant: TOYOTA JIDOSHA KABUSHIKI KAISHA, Toyota-shi, Aichi-ken (JP)

(72) Inventor: Rie Murai, Tokyo (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/114,231

(22) PCT Filed: Jan. 29, 2015

(86) PCT No.: PCT/IB2015/000180
§ 371 (c)(1),
(2) Date: Jul. 26, 2016

(87) PCT Pub. No.: WO2015/114453
PCT Pub. Date: Aug. 6, 2015

(65) Prior Publication Data

US 2017/0011627 A1 Jan. 12, 2017

(30) Foreign Application Priority Data

Jan. 31, 2014 (JP) ................................ 2014-016740

(51) Int. Cl.
*G06N 7/00* (2006.01)
*G08G 1/01* (2006.01)
*G08G 1/08* (2006.01)
*G08G 1/097* (2006.01)

(52) U.S. Cl.
CPC ......... *G08G 1/0129* (2013.01); *G08G 1/0112* (2013.01); *G08G 1/08* (2013.01); *G08G 1/097* (2013.01)

(58) Field of Classification Search
None
See application file for complete search history.

(56) References Cited

U.S. PATENT DOCUMENTS

2013/0103291 A1 4/2013 Hayashida et al.
2016/0379126 A1* 12/2016 Ozatay ................ G06N 99/005 706/12

FOREIGN PATENT DOCUMENTS

| | | | |
|---|---|---|---|
| CN | 102779415 | A | 11/2012 |
| JP | 2008-197724 | A | 8/2008 |
| JP | 2009-116508 | A | 5/2009 |
| JP | 2010-008068 | A | 1/2010 |
| WO | 2013/060774 | A1 | 5/2013 |

* cited by examiner

*Primary Examiner* — Brent Swarthout
(74) *Attorney, Agent, or Firm* — Sughrue Mion, PLLC

(57) ABSTRACT

For each of the traveling directions (traveling direction 1 to traveling direction 4) at an intersection, a traffic-light cycle length estimation device acquires a time at which a vehicle in the stopped state starts moving, calculates the time difference between neighboring start times, which have been acquired, as a start interval, and generates a histogram based on the number of samplings of start intervals. The device combines the generated histograms into a histogram for all direction to generate one histogram that represents the relation between the start intervals and the number of samplings and, based on this histogram, estimates the cycle length of the traffic light. If a particular value, one of the start intervals, corresponds to the maximum number of samplings, that particular value is estimated as the cycle length.

10 Claims, 9 Drawing Sheets

TRAFFIC-LIGHT CYCLE LENGTH ESTIMATION DEVICE

BACKGROUND OF THE INVENTION

1. Field of the Invention

The present invention relates to a traffic-light cycle length estimation device for estimating a cycle length that is a time interval from the time the traffic light color changes to green to the time the traffic light color changes back to green via yellow and red.

2. Description of Related Art

A traffic-light information estimation device for estimating a cycle length is proposed, for example, in Japanese Patent Application Publication No. 2009-116508 (JP 2009-116508 A). The cycle length refers to a time interval from the time the color of a traffic light, installed at an intersection, changes to green to the time the color of the traffic light changes back to green via yellow and red. This device estimates the cycle length of a traffic light, based on the time difference between the time a vehicle in the stopped state at an intersection starts moving when the traffic light changes to green and the time a vehicle starts moving at a later time when the traffic light changes to green again.

However, because the device described above assumes that there is always a vehicle that starts moving when the traffic light changes to green, the cycle length cannot be estimated at an intersection where the traffic is light.

SUMMARY OF THE INVENTION

The present invention provides a traffic-light cycle length estimation device capable of estimating a traffic-light cycle length even at an intersection where the traffic is light.

An aspect of the present invention relates to a traffic-light cycle length estimation device. A traffic-light cycle length estimation device includes a time acquisition unit that acquires information about a start time at which a vehicle in a stopped state at a target intersection starts moving, the target intersection being an intersection where a traffic light is installed, the start time including a start time at which a vehicle starts moving in each of a plurality of start directions at the target intersection; a time difference calculation unit that calculates a time difference between neighboring times of the start times based on the time information acquired by the time acquisition unit; and an estimation unit that estimates a cycle length of the traffic light installed at the target intersection, based on a plurality of the time differences calculated by the time difference calculation unit.

A plurality of traffic lights installed at an intersection has the same cycle length. In view of this, in estimating the cycle time based on the time differences among start times, the device described above uses the times at which vehicles start moving in a plurality of directions. In other words, the device uses the start times of vehicles that start moving when two or more traffic lights, installed at one intersection, change to green. Using these start times increases the number of samplings between the start times used for estimating the cycle time, allowing the cycle time to be estimated even at an intersection where the traffic is light.

In the above aspect, the traffic-light cycle length estimation device may further include a relative frequency generation unit that, for the time differences calculated by the time difference calculation unit, generates relative relation information about a number of samplings of each of the time differences that have the same value to each other wherein, if a particular value of the time differences calculated by the time difference calculation unit is a value corresponding to a maximum number of samplings, the estimation unit may estimate the particular value as the cycle length.

The inventor has found the tendency that the value of the time difference corresponding to the maximum number of samplings is near to the cycle length of a traffic light installed at an intersection. In view of this, if a particular value corresponds to the maximum number of samplings, the device described above estimates the particular value as the cycle length.

In the above aspect, if a particular value of the time differences calculated by the time difference calculation unit is a minimum value, the estimation unit may estimate the particular value as the cycle length.

A time difference that is not the minimum is considered a multiple of the cycle length. In view of this, if a particular value is the minimum, the device described above estimates the particular value as the cycle length.

In the above aspect, if the particular value is a greatest common divisor of values of the calculated time differences, the estimation unit may estimate the particular value as the cycle length.

The time difference between the neighboring start times is considered the cycle time or an integral multiple thereof. In view of this, the condition for estimating a particular value as the cycle length includes the condition that the particular value is the greatest common divisor of the calculated time differences. This increases the accuracy of estimation that the particular value is the cycle length.

In the above aspect, the estimation unit may include a greatest common divisor calculation unit that calculates a greatest common divisor of the values of the time differences calculated by the time difference calculation unit and, if the particular value is not a greatest common divisor of the calculated time differences, the estimation unit may estimate the greatest common divisor, calculated by the greatest common divisor calculation unit, as the cycle length.

For use when it is considered that estimating a particular value as the cycle length is not appropriate, the device described above includes the greatest common divisor calculation unit to estimate a value, more appropriate than the particular value, as the cycle length.

In the above aspect, the estimation unit may include a greatest common divisor calculation unit that calculates a greatest common divisor of the values of the time differences calculated by the time difference calculation unit and the estimation unit may estimate the greatest common divisor, calculated by the greatest common divisor calculation unit, as the cycle length.

The time difference between the neighboring start times is considered the cycle time or an integral multiple thereof. Therefore, the greatest common divisor of the time difference values is most likely the cycle length. In view of this, the device described above includes the greatest common divisor calculation unit to estimate the cycle length accurately.

In the above aspect, the time difference calculation unit may include a raw data generation unit that calculates the time differences among the times; and a representative value calculation processing unit that calculates a representative value based on the time differences which are generated by the raw data generation unit and the time difference among which is equal to or smaller than a predetermined value, and the representative value calculated by the representative value calculation processing unit may be output as the time difference.

The time difference between the neighboring start times is considered an integral multiple of the cycle time that is a period of time from the time the traffic light changes to green to the time the traffic light changes to green again. However, there is a variation in the delay time from the time the traffic light changes to green to the time a vehicle starts moving. Therefore, the time differences are distributed around an integral multiple of the cycle length. In view of this, the device described above includes the representative value calculation unit to define a representative value, making it easy to estimate the particular value as the cycle time.

In the above aspect, the time acquisition unit may selectively acquire the start time of a first vehicle when a plurality of vehicles traveling in the same direction, which is in a stopped state, starts moving at the intersection.

When a plurality of vehicles traveling in the same direction, which is in the stopped state, starts moving at the intersection, there is a tendency that the start time of the second and the subsequent vehicles delays from the start time of the first vehicle and that the start time of the first vehicle is nearest to the time the traffic light changes to green. In view of this, the device described above selectively acquires the start time of the first vehicle to acquire accurate information about the time the traffic light changes to green.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A traffic-light cycle length estimation device in a first embodiment is described below with reference to the drawings.

Figure 1:
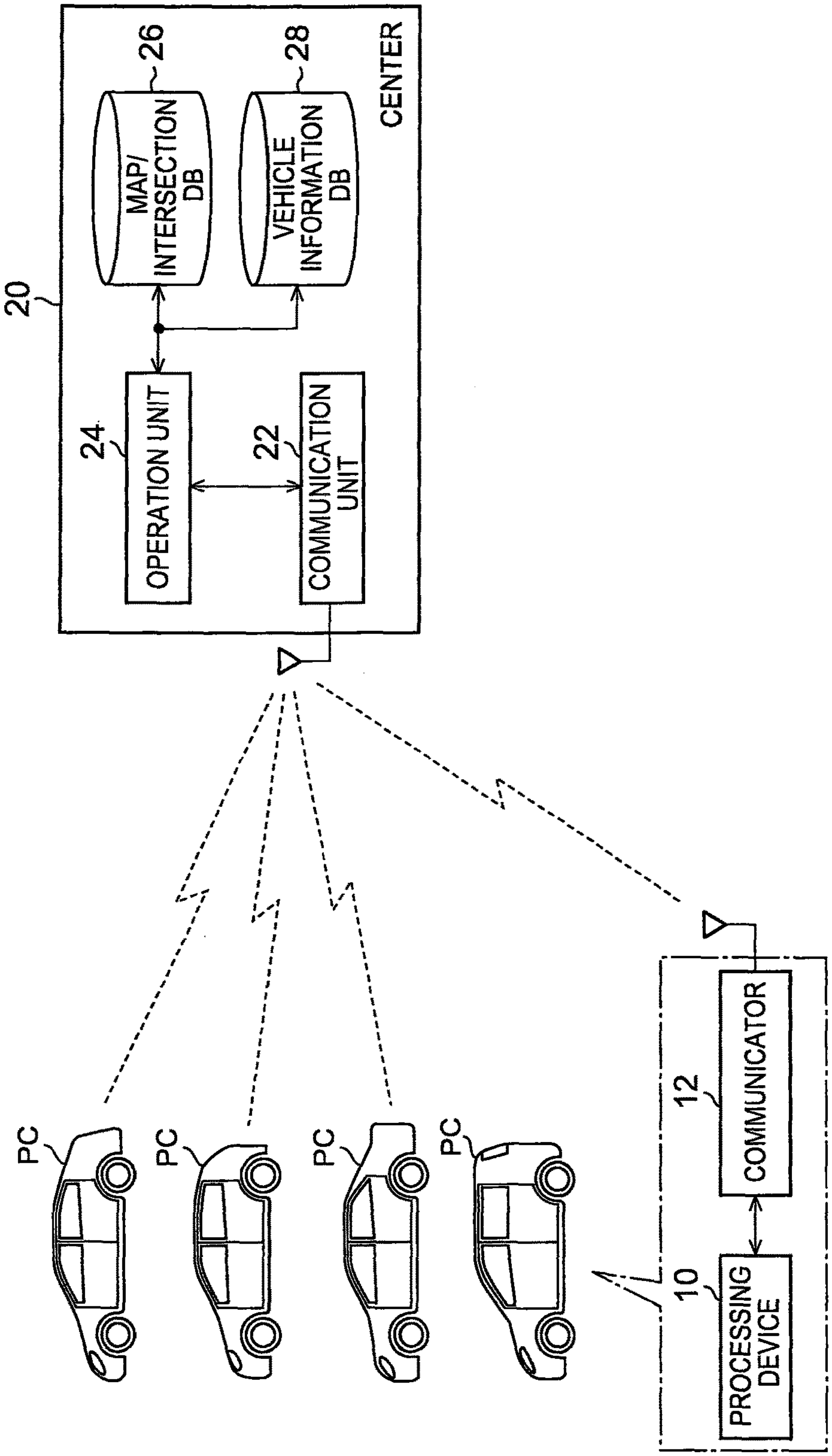
FIG. 1 is a system configuration diagram in a first embodiment.

FIG. 1 shows the system configuration in the embodiment. In the system shown in the figure, a vehicle PC traveling on a road communicates with a center 20. In this system, a vehicle PC that can communicate with the center 20 includes a processing device 10 and a communicator 12. The processing device 10 is an electronic device that performs various types of operation processing. As the processing device 10, an electronic device having a navigation system is assumed. The communicator 12 is an electronic device that wirelessly communicates with a communication unit 22 provided in the center 20.

On the other hand, the center 20 includes the communication unit 22 that wirelessly communicates with the communicator 12, an operation unit 24 that performs various types of operation, a map/intersection database 26, and a vehicle information database 28.

The map/intersection database 26 stores road map information including the intersection information. The vehicle information database 28 stores information about the vehicle PCs that are sent from the vehicle PCs and received by the communication unit 22. The operation unit 24 estimates a traffic-light cycle length based on the information stored in the map/intersection database 26 and the vehicle information database 28.

Figure 2A:
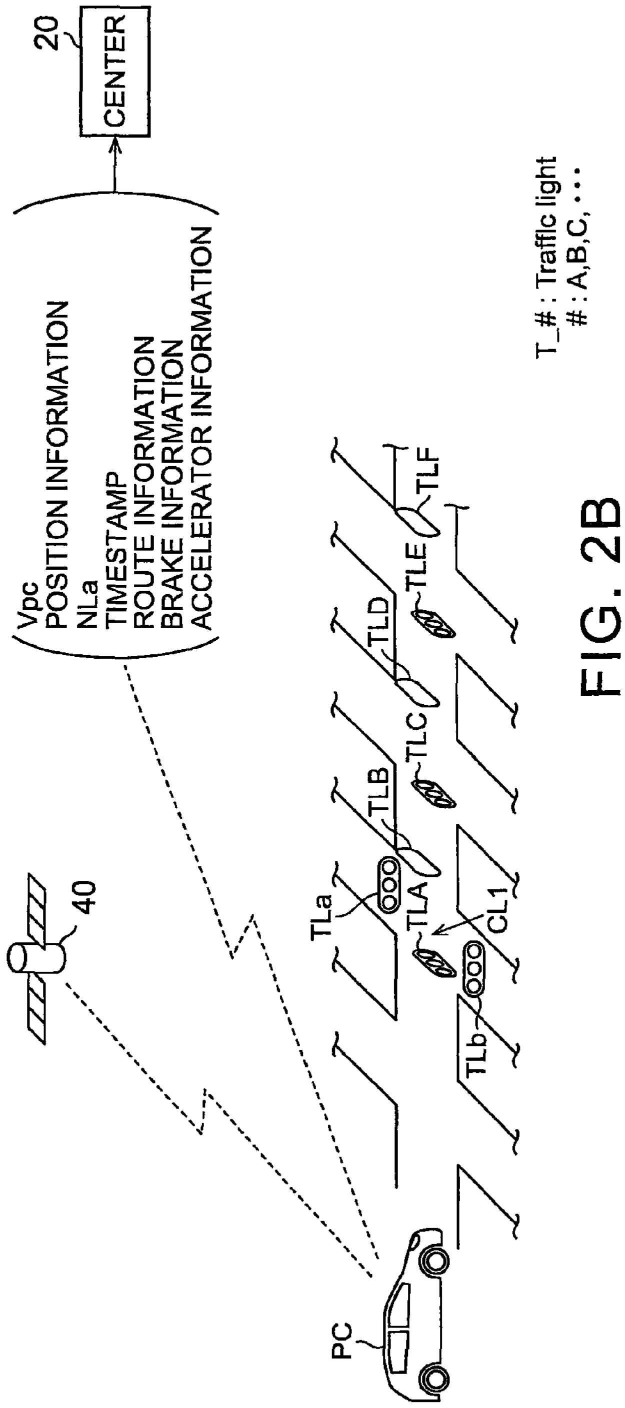
FIGS. 2A-2B are diagrams showing a traveling information collection method in the embodiment.

The estimation processing for estimating a traffic-light cycle length is described in detail below. FIG. 2A shows an example in which there are intersections at which the traffic lights, TLA to TLF, are installed in this order in the traveling direction of a vehicle PC. Among these traffic lights, the vehicle PC should see the traffic lights TLB, TLD, and TLF when it travels straight ahead. For example, at the intersection CL1, the traffic light TLA is a traffic light that a vehicle that travels in the direction, opposite to the direction of the vehicle PC shown in FIG. 2, should see when it enters the intersection CL1.

When traveling on a road, a vehicle PC sends the traveling information to the center 20. The traveling information includes the traveling speed of the vehicle PC (vehicle speed Vpc), position information, link information (in the figure, the link number NLa is shown as an example), time information (timestamp) associated with the vehicle speed Vpc, position information, and link information, and route information indicating the planned traveling route of the vehicle PC. The route information can be obtained only when the driver of the vehicle PC sets a destination in advance using the navigation system. When a destination is not set, the route information is not included in the traveling information. In addition to the information described above, the traveling information may include the time-series information on the brake operation (brake information) and the time-series information on the accelerator operation (accelerator information).

Figure 2B:
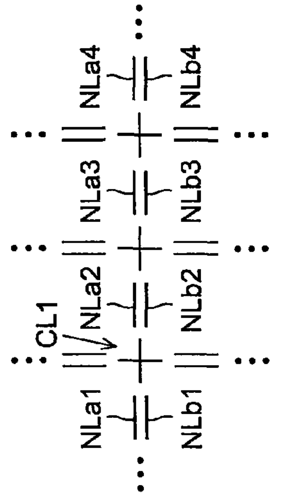

The position information described above is information for identifying the position of the vehicle PC. More specifically, the position information is information (latitude information and longitude information) obtained by receiving signals from a GPS satellite 40. The link information is information for identifying the traveling direction. More specifically, the link information identifies a corresponding link number that is one of the link numbers held by the navigation system included in the processing device 10. FIG. 2B schematically shows the link information. In the navigation system, link numbers NLa1-NLa4 and NLb1-NLb4 are given to the roads, each of which is partitioned by the intersections, as shown in the figure. The link numbers NLa1-NLa4 specify the lane in which the vehicle travels from the intersection, at which the traffic light TLB is installed, to the intersection at which the traffic light TLF is installed. On the other hand, the link numbers NLb1-NLb4 specify the lane in which the vehicle travels from the intersection, at which the traffic light TLE is installed, to the intersection at which the traffic light TLA is installed.

The navigation system in the processing device 10 identifies a link number based on the position information described above and the road information held in the navigation system. More specifically, when it is determined based on the position information that the vehicle PC is positioned before the intersection at which the traffic light TLA is installed, the navigation system selects the link numbers NLa1 and NLb1 as correct link number candidates. Next, the navigation system identifies the vehicle traveling direction based on a change in the position information and, then, identifies the link number NLa1 in the example shown in FIG. 2A. In this case, instead of using the vehicle traveling direction, the route information may be used to identify a link number. Of course, the route information may also be used to identify the vehicle traveling direction without using the link information.

Figure 3:
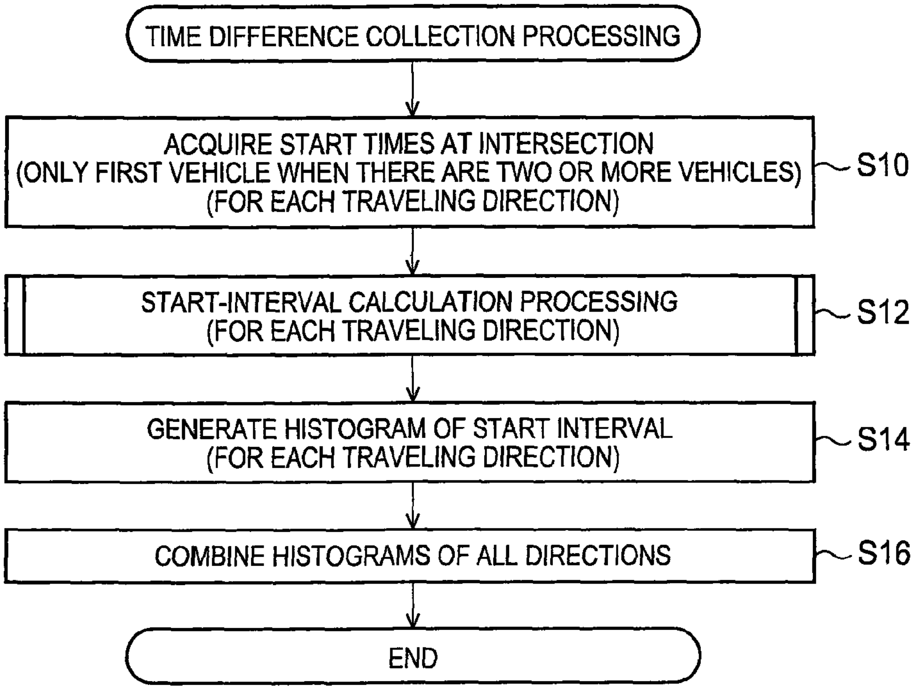
FIG. 3 is a flowchart showing a procedure for the time-difference collection processing in the embodiment.

The center 20 generates the vehicle information database 28 based on the information about the traveling of the vehicle PC above and, based on the generated vehicle information database 28, estimates the traffic-light cycle length of each intersection. FIG. 3 shows a procedure of processing for collecting the time-difference data used to estimate the traffic-light cycle length. This processing is performed by the operation unit 24.

In the sequence of processing shown in FIG. 3, the operation unit 24 performs the following for a target intersection for which the traffic-light cycle length is to be estimated. That is, the operation unit 24 acquires the start-time sampling values of a vehicle PC, which travels in a particular traveling direction, based on the vehicle information database described above (S10). For example, when the intersection CL1 shown in FIG. 2A is a target intersection, the operation unit 24 acquires the start-time sampling values at the intersection CL1 for a vehicle that should see one particular traffic light of the traffic lights TLA, TLB, TLa, and TLb at the intersection CL1. In this case, the start-time sampling value is identified based on the traveling information on the vehicle PC. That is, when the vehicle speed Vpc becomes zero before the intersection CL1, it is determined that the vehicle PC has stopped at the intersection CL1 and, after that, when the vehicle speed Vpc becomes a value larger than 0, that time is identified as the start time. The processing for determining whether the vehicle PC has stopped or started may be performed by receiving not only the vehicle speed Vpc but also the brake information or the accelerator information. In this case, it is determined that the vehicle PC has stopped if the logical AND between the two conditions is true, one condition is that the vehicle speed Vpc has reached zero and the other condition is that the brake is applied. It is also determined that the vehicle PC has started moving when the accelerator is pressed and the vehicle speed Vpc has changed to a value larger than zero.

If two or more vehicles traveling in the same traveling direction are in the stopped state at one intersection, the start time of only the first vehicle is acquired in this embodiment. This is because, when the traffic light changes from red to green, it is considered that the variation in the delay in the start time of the first vehicle is smaller than the variation in the delay in the start time of the second and the subsequent vehicles. The first vehicle, one of the vehicles that stop at the same intersection at the same time, can be identified based on the position information.

Figure 4:
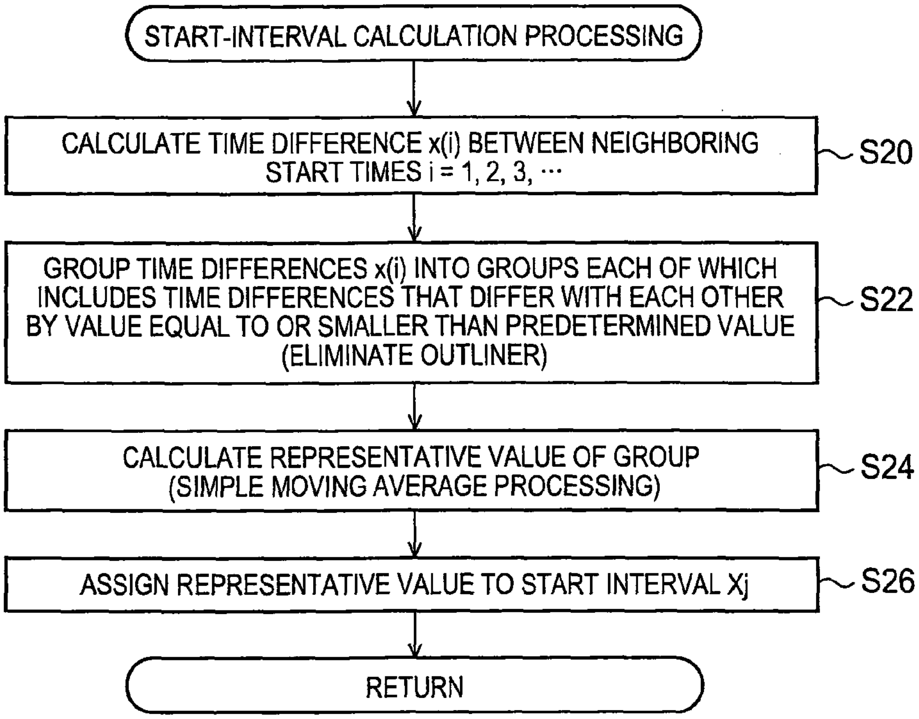
FIG. 4 is a flowchart showing a procedure for the start interval calculation processing in the embodiment.

Next, the operation unit 24 performs the processing for calculating an interval between the neighboring start times (start interval) for a vehicle that travels in a particular traveling direction (S12). FIG. 4 shows the detail of this processing.

In the sequence of processing shown in FIG. 4, the operation unit 24 first performs the calculation processing for calculating the time difference x(i) between the neighboring start times (S20). For example, if the sampling values collected on a particular day include "19 minutes past 12" and "21 minutes past 12" with no intervening sampling value, the time difference is calculated as "120 s".

Next, the operation unit 24 groups the time differences x(i) into groups, each of which includes time differences x(i) that differ with each other by a value equal to or smaller than a predetermined value (for example, 2 s to 5 s), based on the cycle length (S22). This processing is performed to make the time differences x(i), included in each group, correspond to the same multiple of the cycle length, considering the fact that the time difference x(i) corresponds not only to the cycle length but also to a multiple of the cycle length. For example, at the intersection CL1 shown in FIG. 2A, assume the following situation. That is, a vehicle that has been in the stopped state because the traffic light TLB is red starts moving when the traffic light TLB changes to green. After that, when the traffic light TLB changes to red again, there is no vehicle that is in the stopped state and, after that, when the traffic light TLB changes to green and then red, there is a vehicle that is in the stopped state. In this situation, the time difference x(i) between the neighboring start times is about twice the period of time during which the traffic light changes from green to the next green (cycle length). In this way, because the time difference x(i) corresponds to a time difference that is generated by multiplying the cycle length by one of various integers, the time differences are grouped into groups.

This processing can be performed by selecting a median so that as many sampling values as possible are included in a region the boundaries of which are the predetermined value away from the median on both sides or in a region the boundaries of which are an integral multiple of the predetermined value away from the median on both sides. That is, the sampling values included in each region, defined by the median, are considered to belong to the same group. The sampling values not included in any region in this processing are eliminated (outliers).

Next, the operation unit 24 calculates the representative value of each group (S24). In this embodiment, the representative value is the simple moving average of the sampling values in the same group. The operation unit 24 assigns each of the calculated representative values to the start interval Xj (j=1, 2, 3, . . . ) (S26) and then terminates the processing in step S12 in FIG. 3. As a result, the start intervals Xj are calculated for the groups identified in step S22, one for each.

Next, the operation unit 24 generates a histogram that associates each of the start intervals Xj, which differ from each other, with the number of samplings (S14). In this case, the number of samplings of each of the start intervals Xj is the number of samplings of the time difference x(i) used for the calculation of the start interval Xj. After that, the operation unit 24 combines the histograms, generated in step S14 for each of all start directions, into one histogram to generate a histogram for all directions (S16). For example, when vehicles starts at the intersection CL1 shown in FIG. 2A, the operation unit 24 combines the histogram about a vehicle that sees the traffic light TLA, the histogram about a vehicle that sees the traffic light TLB, the histogram about a vehicle that sees the traffic light TLa, and the histogram about a vehicle that sees the traffic light TLb.

In combining the histograms, if two or more start intervals, which differ from each other, are included in the histograms for different directions and if their difference is equal to or smaller than the predetermined value (for example, 2 s-5 s), those start intervals are assumed to belong to the same group and the start interval in the combined histogram is calculated through the moving average processing. For example, when the number of samplings of the start interval "119 s" is "M" in one direction and the number of samplings of the start interval "120 s" is "L" in another direction, the number of samplings of the start interval "(M·119+L·120)/(M+L)" is "M+N" in the histogram created in step S16. When the processing in step S16 is completed, the operation unit 24 once terminates the sequence of processing shown in FIG. 3.

Figure 5A:
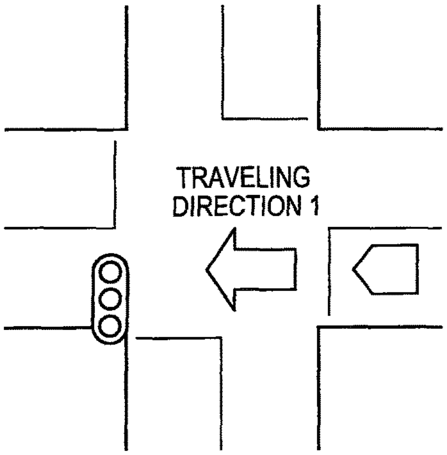
FIGS. 5A-5B are diagrams showing the start interval histogram generation processing in the embodiment.
Figure 5B:
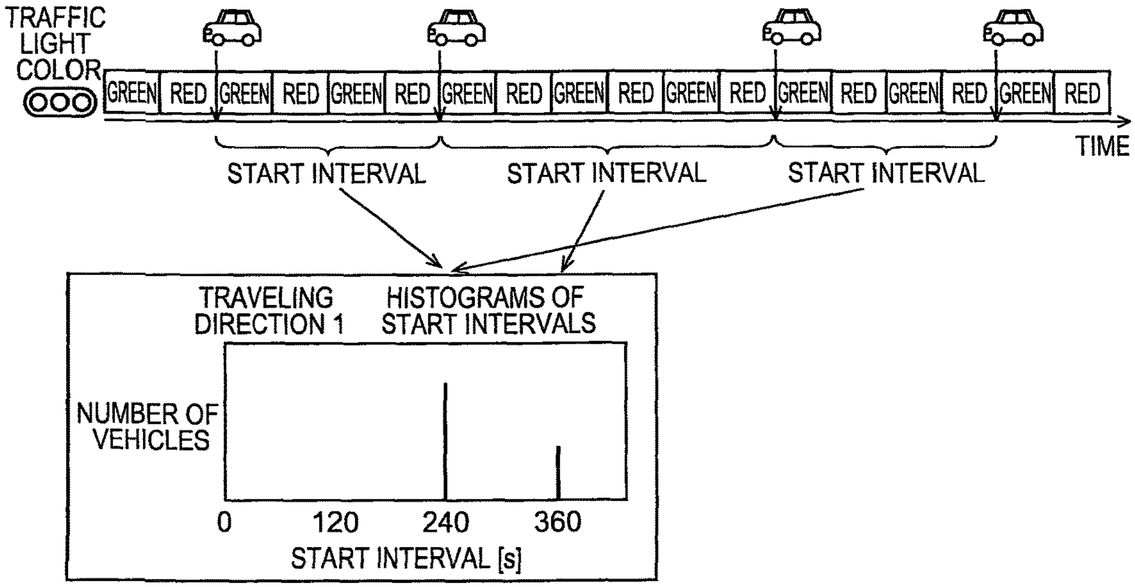

The following describes the purpose of combining the histograms for all directions. Consider the case in which a vehicle starts moving in a particular direction (traveling direction 1) at a particular intersection as shown in FIG. 5A. Assume here that the traffic-light cycle length of this intersection is "120 s". For an intersection where the traffic is light, there is a possibility that only a multiple of the start interval is generated with no start interval corresponding to the cycle length as shown in FIG. 5B.

Figure 6:
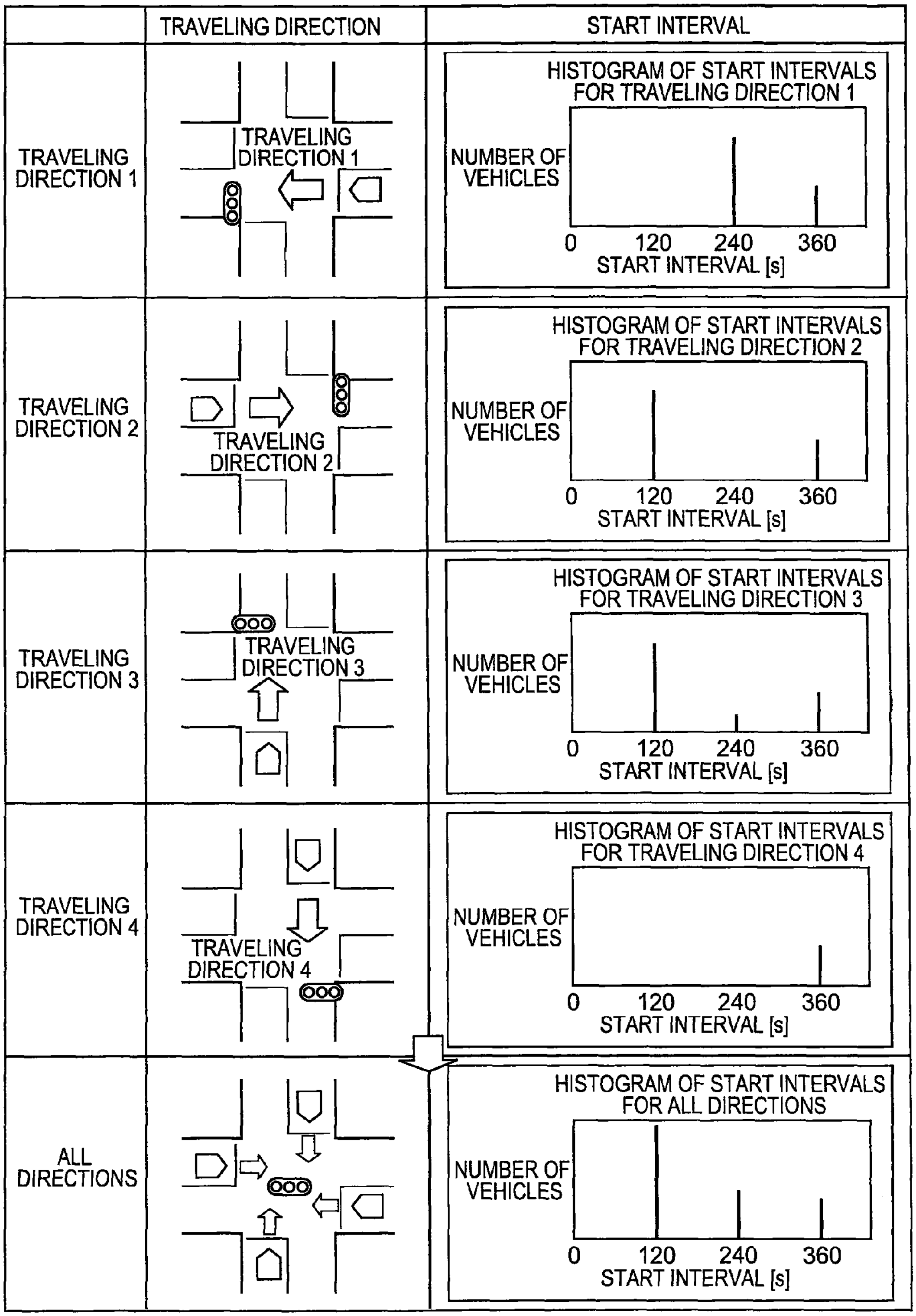
FIG. 6 is a diagram showing the histogram generation processing for all directions in the embodiment.

On the other hand, when all histograms for traveling direction 1, traveling direction 2, traveling direction 3, and traveling direction 4 are combined as shown in FIG. 6, the probability of the occurrence of the start interval Xj, which corresponds to the cycle length, can be increased.

Figure 7:
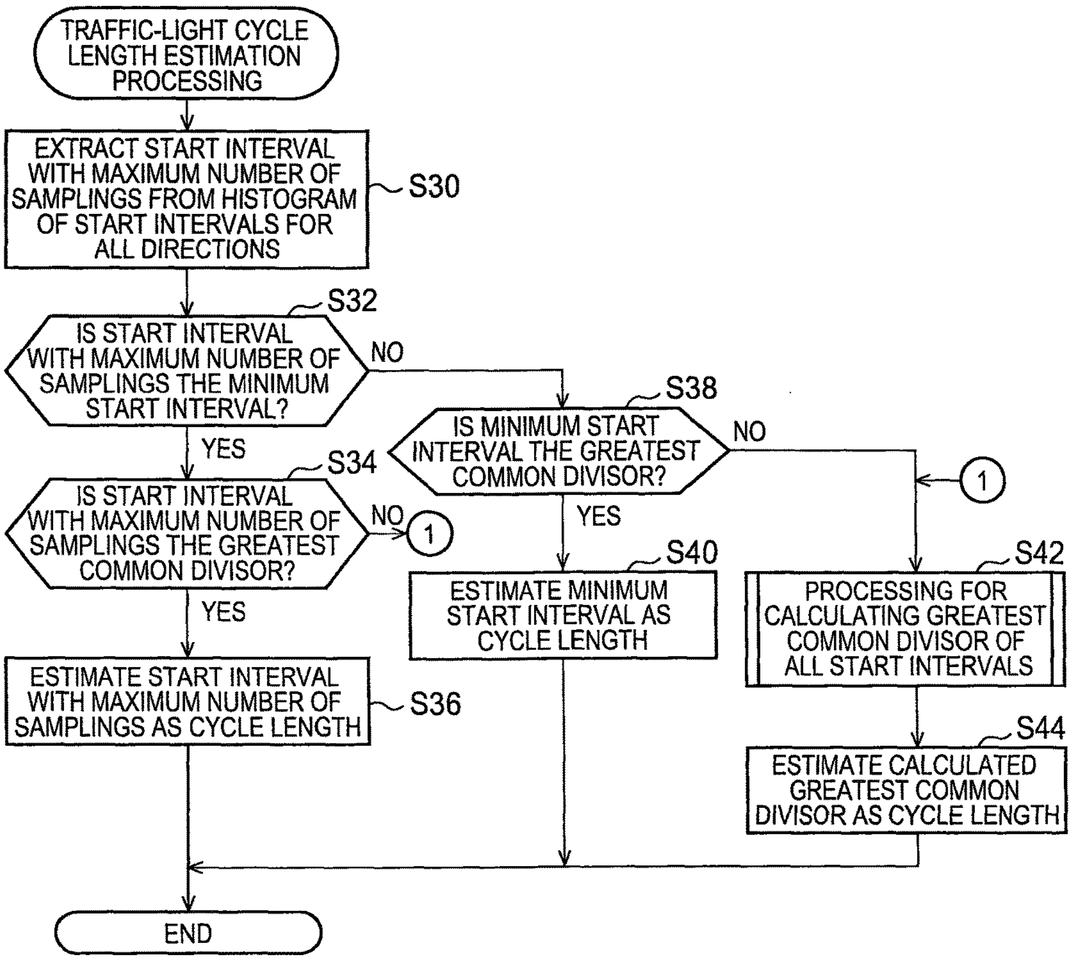
FIG. 7 is a flowchart showing a procedure for the cycle length estimation processing in the embodiment.

FIG. 7 shows a procedure for the traffic-light cycle length estimation processing. This processing is performed by the operation unit 24. In this sequence of processing, the operation unit 24 first extracts a start interval, which corresponds to the maximum number of samplings, from the histogram generated by the processing in step S16 in FIG. 3 (S30). This processing is performed based on the consideration that the start interval with the maximum number of samplings is most likely the value corresponding to the cycle length. FIG. 6 schematically shows an example in which the start interval with the maximum number of samplings is "120 s" that is equal to the cycle length.

Next, the operation unit 24 determines whether the start interval with the maximum number of samplings is the minimum start interval in the histogram generated in step S16 in FIG. 3 (S32). This processing is performed to determine whether the condition that the start interval with the maximum number of samplings is the cycle length is satisfied. That is, because there is no start interval shorter than the cycle length, it is reasonable that the condition that there is no start interval, which is shorter than the cycle length, is satisfied when estimating that the start interval with the maximum number of samplings is the cycle length.

If the start interval with the maximum number of samplings is the minimum start interval in the histogram (S32: YES), the operation unit 24 determines whether the start interval with the maximum number of samplings is the greatest common divisor of the start interval Xj (j=1, 2, 3, . . . ) in the histogram generated by the processing in step S16 in FIG. 3 (S34). This processing is performed to determine whether the condition that the start interval with the maximum number of samplings is the cycle length is satisfied. That is, because the start intervals Xj in the histogram should be all a multiple of the cycle length, it is reasonable that the condition that the start interval with the maximum number of samplings is the greatest common divisor of all start intervals Xj in the histogram is satisfied when estimating that the start interval with the maximum number of samplings is the cycle length. Note that the condition that the start interval with the maximum number of samplings is the greatest common divisor is less strict than the condition that a multiple of the start interval with the maximum number of samplings corresponds to each of the start intervals in the histogram. The reason is that there is a delay time between the time the traffic light TLA changes from red to green and the time a vehicle PC starts moving and that this delay time may vary according to the user's driving tendency or the surrounding situation. That is, as long as the delay time varies, a deviation may be generated between the start interval calculated by the processing in FIG. 3 and a multiple of the cycle length. Therefore, in this embodiment, if the difference between a multiple of the start interval with the maximum number of samplings and the start interval in the histogram is equal to or smaller than a predetermined value (for example, 2 s-5 s), it is determined that the start interval with the maximum number of samplings is the greatest common divisor of the start intervals in the histogram.

If it is determined that the start interval with the maximum number of samplings is the greatest common divisor of the start intervals in the histogram (S34: YES), the operation unit 24 estimates that the start interval with the maximum number of samplings is the cycle length (S36).

On the other hand, if the start interval with the maximum number of samplings is not the minimum start interval in the histogram (S32: NO), the operation unit 24 determines whether the minimum start interval is the greatest common divisor (S38). This processing is performed to determine whether the condition that the minimum start interval is the cycle length is satisfied. In this case, the method for determining that the minimum start interval is the greatest common divisor is the same as that used in the processing in step S34. If it is determined that the minimum start interval is the greatest common divisor (S38: YES), the operation unit 24 estimates that the minimum start interval is the cycle length (S40).

Figure 8:
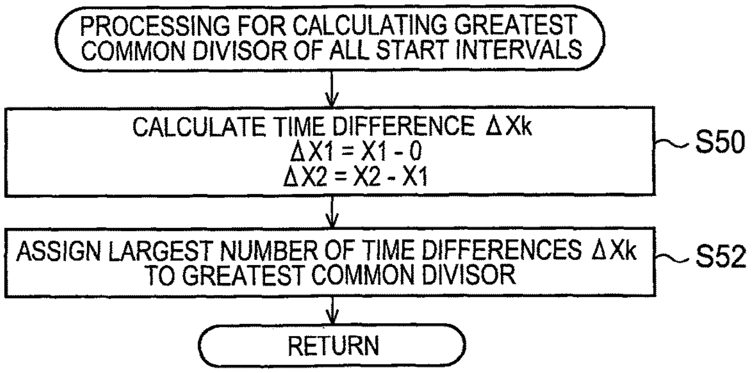
FIG. 8 is a flowchart showing a procedure for the greatest common divisor calculation processing for all start intervals in the embodiment.

On the other hand, if it is determined that the minimum start interval is not the greatest common divisor (S38: NO), the operation unit 24 calculates the greatest common divisor of all start intervals Xj (J=1, 2, 3, . . . ) in the histogram generated in step S16 in FIG. 3 (S42). FIG. 8 shows the procedure for this processing.

Figure 9:
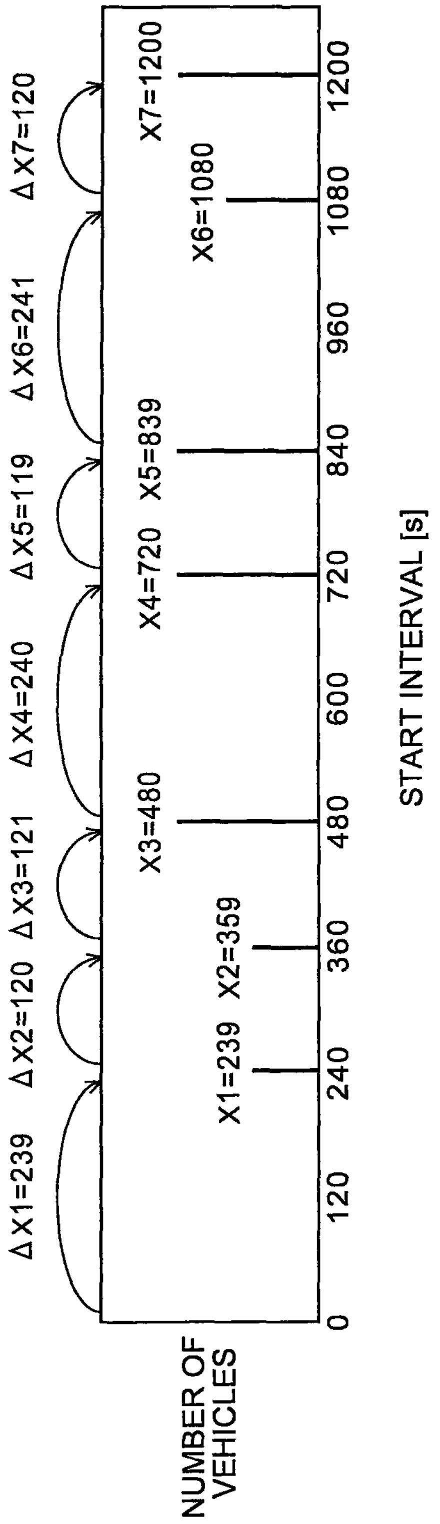
FIG. 9 is a diagram showing the greatest common divisor calculation method in the embodiment.

In the sequence of this processing, the operation unit 24 first calculates the time difference ΔXk that is the difference between the neighboring start intervals X1, X2, . . . in the histogram (S50). This is described more in detail with reference to FIG. 9. FIG. 9 shows an example of the histogram generated in step S16 in FIG. 3. The figure shows that seven start intervals, X1, X2, . . . , X7, in the combined histogram for all directions are "239, 359, 480, 720, 839, 1080, 1200" respectively. In the processing in step S50, the operation unit 24 calculates a total of seven time differences ΔX1-ΔX7 such as the difference between start interval X1 and "0" as time difference ΔX1 and the difference between start interval X2 and start interval X1 as time difference ΔX2. These time differences ΔX1-ΔX7 are calculated as candidates for the greatest common divisor. For time difference ΔX1, the difference is calculated exceptionally from "0" as described above.

Next, the operation unit 24 estimates the largest number of time differences ΔXk as the greatest common divisor (S52). That is, in the example shown in FIG. 9, there are two time differences ΔXk the value of which is "120". Because the number of this time difference values is the maximum, the operation unit 24 estimates "120 s" as the greatest common divisor. When the processing in step S52 is completed, the operation unit 24 completes the processing in step S42 in FIG. 7. The operation unit 24 estimates the greatest common divisor, calculated in step S42, as the cycle length (S44). When the processing in step S36, S40, or S44 is completed, the operation unit 24 once terminates the sequence of processing shown in FIG. 7.

Figure 10A:
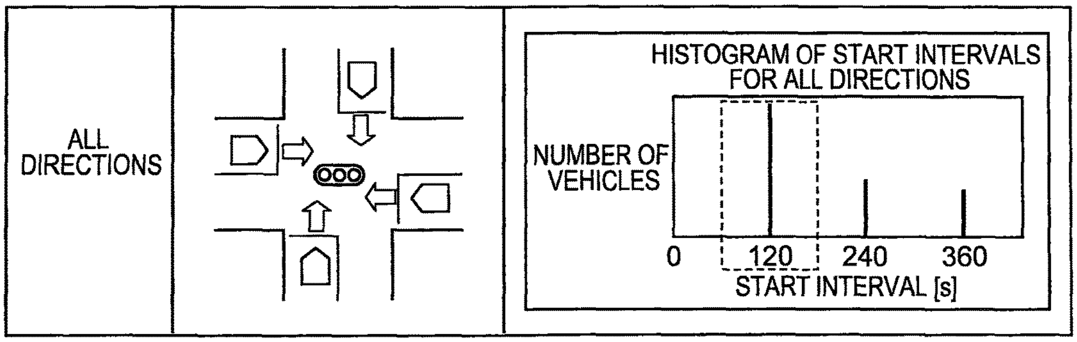
FIGS. 10A-10C are diagrams showing examples for estimating the cycle length in the embodiment.

The following describes the operation of this embodiment with reference to FIG. 10A for 10C. FIG. 10A shows an example in which the start interval, which is the minimum in the histogram generated in step S16 in FIG. 3, is the start interval with the maximum number of samplings (120 s in the example). In this case, because step S32 in FIG. 7 is affirmative, the operation unit 24 estimates this start interval as the cycle length in step S36 if the condition in step S34 is satisfied.

Figure 10B:
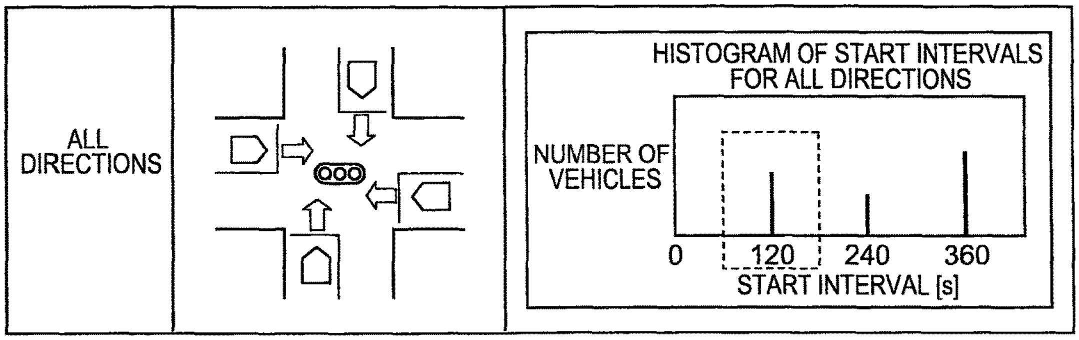

FIG. 10B shows an example in which the number of samplings of the minimum start interval (120 s in the example) is not the maximum. In this case, if the condition in step S38 is satisfied, the operation unit 24 estimates the minimum start interval as the cycle length in step S40.

Figure 10C:
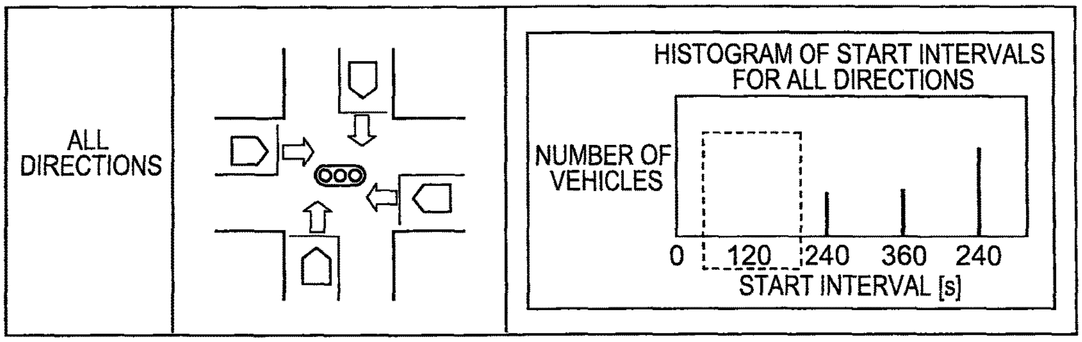

FIG. 10C shows an example in which step S38 is determined as negative by the operation unit 24. In this case, the operation unit 24 calculates the greatest common divisor through the processing in step S52 in FIG. 8 and estimates the calculated greatest common divisor as the cycle length.

The cycle length, estimated as described above, is used in the services provided from the center 20 to a vehicle PC. For example, as one of the services, the center 20 predicts a time at which the traffic light will change to green and provides this prediction to a vehicle PC. An actual service for providing the result of predicting a time, at which the traffic light will change to green, is provided in the following manner. For example, a message is sent to a vehicle, which is in the stopped state at an intersection, to prompt it to see the traffic light when the traffic light has changed to green. A message is also sent to a vehicle that remains in the stopped state even after the traffic light has already changed to green.

The embodiment described above achieves the effect given below.

(1) The time differences between the neighboring sampling values of start times at an intersection, for which the cycle length is to be estimated, are combined for all start directions (step S16 in FIG. 3). Combining the time differences for all directions in this manner increases the number of samplings of time differences between the start times used for estimating the cycle length, thus allowing the cycle length to be estimated even at an intersection where the traffic is light.

(2) If a particular value of the start intervals in the histogram, generated by the processing in step S16 in FIG. 3, corresponds to the maximum number of samplings, the particular value is estimated as the cycle time (S36). In this case, except when the traffic is extremely light at an intersection, the value of the start interval corresponding to the maximum number of samplings is considered to be near to the cycle length of a traffic light at the intersection. Therefore, using a start interval with the maximum number of samplings as a candidate for the cycle length makes it possible to estimate the cycle length correctly.

(3) If a particular value of the start intervals in the histogram, generated by the processing in step S16 in FIG. 3, is the minimum value, the particular value is estimated as the cycle time (S40). In this case, a start interval that is one of the start intervals described above but is not the minimum is considered to correspond to a multiple of the cycle length. Therefore, using the minimum as a candidate for the cycle length makes it possible to estimate the cycle length correctly.

(4) If a particular value of the start intervals in the histogram, generated by the processing in step S16 in FIG. 3, is the greatest common divisor of all start intervals, the particular value is estimated as the cycle length (S36, S40). This increases the estimation accuracy of the cycle length because all start intervals are an integral multiple of the cycle length.

(5) If the minimum start interval is not the cycle length (S38: NO), the greatest common divisor of all start intervals is used as the cycle length (S44). This makes it possible to estimate the cycle length even if any sampling value of the start interval does not correspond to the cycle length.

(6) The start interval Xj is calculated through the moving average processing of the sampling values of the time difference x(i). This makes it possible to uniquely determine the start interval Xj corresponding to a predetermined multiple of the cycle length even if there is a variation in the time differences corresponding to the same multiple of the cycle length.

(7) When a plurality of vehicles that is in the stopped state at the same intersection starts moving, the start time of the first vehicle is selectively used to calculate the start interval Xj (step S10 in FIG. 3). This makes it possible to calculate the start interval Xj based on accurate information about the time the traffic light changes to green.

Second Embodiment

A second embodiment is described below with reference to the drawings with focus on the difference from the first embodiment.

Figure 11:
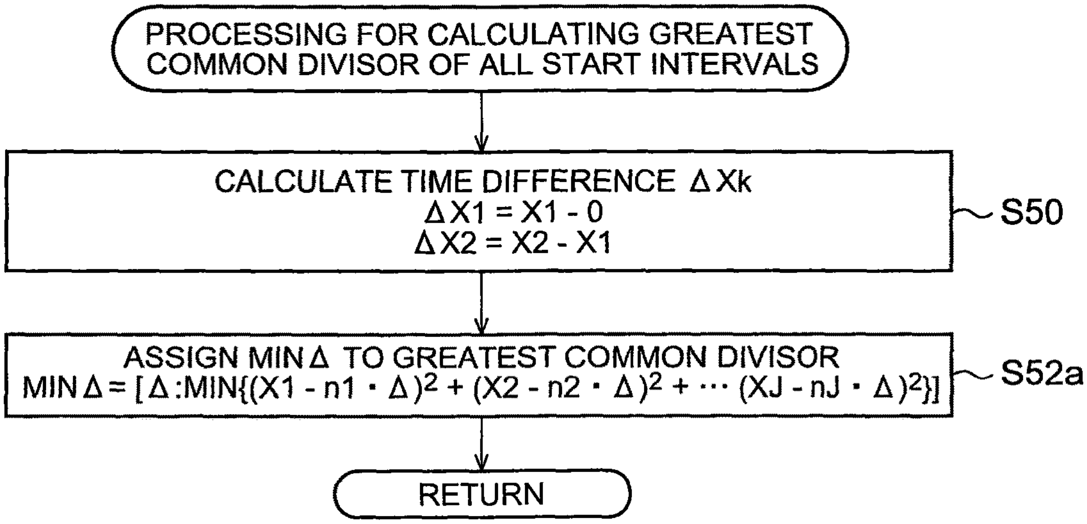
FIG. 11 is a flowchart showing a procedure for the greatest common divisor calculation processing for all start intervals in a second embodiment.

In this embodiment, the processing in step S42 in FIG. 7 is performed by the processing in FIG. 11 instead of the processing in FIG. 8. In FIG. 11, the same step number is used for the processing corresponding to that in FIG. 8 for the sake of convenience.

When the processing in step S50 is completed in the processing shown in FIG. 11, the operation unit 24 receives the start intervals in the histogram generated by the processing in step S16 in FIG. 3 and calculates the greatest common divisor using the least-squares method (S52*a*). That is, the operation unit 24 calculates the variable Δ that minimizes the sum of squares of the difference between each of the start intervals X1, X2, X3, . . . and each of the integral multiple values of the variable Δ (n1·Δ, n2·Δ, n3·Δ, . . . ) and sets the calculated result to the greatest common divisor. The integers n1, n2, n3, . . . may be any random value. It should be noted that, if the relation "X1<X2<X3 . . . " is satisfied, using the condition "n1<n2<n3 . . . " helps reduce the operation load.

<Correspondence Between Technical Concept and Embodiments>

The following describes the main correspondence between the embodiments described in SUMMARY OF THE INVENTION and the embodiments.

[Time acquisition unit . . . S10, Time difference calculation unit . . . S12, Estimation unit . . . Processing in FIG. 7, Plurality of start directions . . . S16 and see FIG. 6] [Relative frequency generation unit . . . S14, S16, Condition that the value corresponds to a value with the maximum number of samplings . . . S32] ["if a particular value of the time differences calculated by the time difference calculation unit is a minimum value, the estimation unit may estimate the particular value as the cycle length." . . . Processing in S32 and S38] ["if the particular value is a greatest common divisor of values of the calculated time differences, the estimation unit may estimate the particular value as the cycle length." . . . Processing in S34, S38] [Greatest common divisor calculation unit . . . S42, S44] [Greatest common divisor calculation unit . . . S42, S44] [Raw data generation unit . . . S20, Representative value calculation unit . . . S24] ["the time acquisition unit may selectively acquire the start time of a first vehicle when a plurality of vehicles traveling in the same direction, which is in a stopped state, starts moving at the intersection." . . . Processing in S10]

Other Embodiments

The embodiments described above may be changed as follows.

"Processing for Estimating a Start Interval Xj with the Maximum Number of Samplings as the Cycle Length"

After a start interval with the maximum number of samplings is extracted in the processing shown in FIG. 7 (S30), the processing may proceed, not to the processing in step S32, but directly to the processing in step S34.

In addition, a specified value, which is lower than twice (for example, 1.5 times) the lower limit value of a value that can be assumed as the cycle length, is defined for an intersection. In this case, if the start interval with the maximum number of samplings is equal to or smaller than the specified value, the specified value may be estimated as the cycle length without performing the processing in step S34.

In addition, after the processing in step S34, the final cycle length may be calculated by correcting the start interval with the maximum number of samplings. For example, the final cycle length can be calculated using the least-squares method similar to that used in the processing in step S52*a* in FIG. 11. That is, a value considered nearest to the cycle length is calculated from the start interval with the maximum number of samplings and one or more values, each of which differs from this start interval by a value equal to or smaller than predetermined value (for example, 2 s-5 s), through the least-squares method. The calculated value, if different from the value extracted by the processing in step S30, may be used as the corrected value.

"Processing for Estimating the Minimum Value of the Start Interval Xj as the Cycle Length"

For example, the lower limit value of the number of samplings is defined for the minimum start interval Xj. In this case, if the number of samplings is equal to or larger than the lower limit value, the processing in step S38 may be performed. In this case, the processing in steps S30-S36 may be deleted in the processing shown in FIG. 7.

For example, a specified value, which is lower than twice (for example, 1.5 times) the lower limit value of a value that can be assumed as the cycle length, is defined for an intersection. In this case, if the minimum value of the start interval Xj, is equal to or smaller than the specified value, the specified value may be estimated as the cycle length without performing the processing in step S38.

In addition, after the processing in step S38, the final cycle length may be calculated by correcting the minimum value of the start interval. For example, the final cycle length can be calculated using the least-squares method similar to that used in the processing in step S52*a* in FIG. 11. That is, a value considered nearest to the cycle length is calculated from the minimum value of the start interval and one or more values, each of which differs from the minimum value by a predetermined value (for example, 2 s-5 s), through the least-squares method. The calculated value, if different from the minimum value, may be used as the corrected value.

"Greatest Common Divisor Calculation Unit"

For example, instead of the processing in step S52 in FIG. 8, the average of the number of samplings of each of the start intervals Xk and Xk−1, which are used to calculate the time difference ΔXk, is used as the quantitative value (evaluation point) for evaluating the time difference ΔXk, and the time difference ΔXk that has the highest evaluation point may be used as the greatest common divisor. If there are two or more time differences ΔXk that have the same value, the evaluation point of that value is the total of the evaluation points of the time differences ΔXk that have the same value.

"Representative Value Calculation Unit"

In the above embodiments, the representative value is calculated by performing the simple moving average processing for the time differences x(i) that differ with each other by a value equal to or smaller than the predetermined value. The calculation of the representative value is not limited to this method. For example, after calculating sampling values to some extent by the processing exemplified in FIG. 4, the processing for eliminating an outlier in step S22 may be stopped and, for each calculated time difference x(i), the weighted moving average processing with the nearest representative value may be performed to update the representative value. In this case, the weighting factor of each calculated time difference x(i) is set sufficiently smaller than the weighting factor of the representative value.

The representative value need not always be calculated by the moving average processing. For example, the value corresponding to the largest number of samplings in the group, which includes the time differences x(i) that differ with each other by a value equal to or smaller than a predetermined value, may be the representative value.

[Relative Frequency Generation Unit]

When generating a histogram (S14, S16), the number of samplings need not always be associated with each start interval Xj. For example, the ratio (percentage) of the number of samplings of each start interval Xj to the total number of samplings may be generated as the information about relative relation of the number of samplings.

When a plurality of vehicles traveling in the same direction is in the stopped state at an intersection, the "time acquisition unit" need not always acquire the start time of the first vehicle. For example, with a correction added as necessary to the second and the subsequent vehicles, the start times of all vehicles in the stopped state may be used as the sampling values or the average of these start times may be used as the sampling value of one start time.

When the cycle length calculated in the processing in steps S36, S40, and S44 in FIG. 7 is not an integer, the "cycle length value" may be rounded off to the nearest whole number as the final cycle length.

The "plurality of directions" need not always be all directions. For example, the directions may be two directions opposite to each other, two directions intersecting with each other, or three directions.

Even when the start time of a vehicle in one direction is used, the cycle length may be estimated by performing the processing exemplified in FIG. 7.

The invention claimed is:

1. A traffic-light cycle length estimation device comprising:

a processing device comprising:

a time acquisition unit that acquires time information about a plurality of start times at which a plurality of vehicles in a stopped state at a target intersection start moving, the target intersection being an intersection where a plurality of traffic lights are installed, the plurality of start times including times at which the plurality of vehicles start moving in a plurality of start directions corresponding to the plurality of traffic lights, respectively, at the target intersection;

a time difference calculation unit that calculates a plurality of time differences between start times of vehicles moving in a same start direction from among the plurality of start directions based on the time information acquired by the time acquisition unit; and an estimation unit that estimates an optimal cycle length of the plurality of traffic lights installed at the target intersection, by using the plurality of the time differences calculated by the time difference calculation unit, wherein the plurality of start times at which a plurality of vehicles in a stopped state at the target intersection start moving is determined based on receiving, by the processing device, speed information of the plurality of vehicles.

2. The traffic-light cycle length estimation device according to claim 1, the processing device further comprising:

a relative frequency generation unit that, for the plurality of time differences calculated by the time difference calculation unit, generates relative relation information about a number of samplings of each of the plurality of time differences that have the same value to each other wherein if a particular value of the plurality of time differences calculated by the time difference calculation unit is a value corresponding to a maximum number of samplings, the estimation unit estimates the particular value as the optimal cycle length.

3. The traffic-light cycle length estimation device according to claim 1, wherein if a particular value of the plurality of time differences calculated by the time difference calculation unit is a minimum value, the estimation unit estimates the particular value as the optimal cycle length.

4. The traffic-light cycle length estimation device according to claim 2, wherein if the particular value is a greatest common divisor of values of the plurality of time differences calculated, the estimation unit estimates the particular value as the optimal cycle length.

5. The traffic-light cycle length estimation device according to claim 4, wherein the estimation unit comprises a greatest common divisor calculation unit that calculates a greatest common divisor of the values of the plurality of time differences calculated by the time difference calculation unit and if the particular value is not a greatest common divisor of the plurality of time differences calculated, the estimation unit estimates the greatest common divisor, calculated by the greatest common divisor calculation unit, as the optimal cycle length.

6. The traffic-light cycle length estimation device according to claim 1, wherein the estimation unit comprises a greatest common divisor calculation unit that calculates a greatest common divisor of values of the plurality of time differences calculated by the time difference calculation unit and the estimation unit estimates the greatest common divisor, calculated by the greatest common divisor calculation unit, as the optimal cycle length.

7. The traffic-light cycle length estimation device according to claim 1, wherein the time difference calculation unit comprises:

a raw data generation unit that calculates the plurality of time differences between the start times of vehicles moving in a same start direction from among the one or more start directions; and a representative value calculation processing unit that calculates a representative value based on the plurality of time differences that are generated by the raw data generation unit and are equal to or smaller than a predetermined value and the representative value calculated by the representative value calculation processing unit is output as a time difference.

8. The traffic-light cycle length estimation device according to claim 1, wherein the time acquisition unit selectively acquires the start time of a first vehicle when a plurality of vehicles traveling in a same direction, which is in the stopped state at a same time, starts moving at the intersection.

9. The traffic-light cycle length estimation device according to claim 3, wherein if the particular value is a greatest common divisor of values of the plurality of time differences calculated, the estimation unit estimates the particular value as the optimal cycle length.

10. The traffic-light cycle length estimation device according to claim 9, wherein the estimation unit comprises a greatest common divisor calculation unit that calculates a greatest common divisor of the values of the plurality of time differences calculated by the time difference calculation unit and if the particular value is not a greatest common divisor of the plurality of time differences calculated, the estimation unit estimates the greatest common divisor, calculated by the greatest common divisor calculation unit, as the optimal cycle length.

* * * * *